March 8, 1960 J. R. LONG 2,927,471
BELT TENSIONING MOTOR SUPPORT
Filed Feb. 12, 1957 2 Sheets-Sheet 1
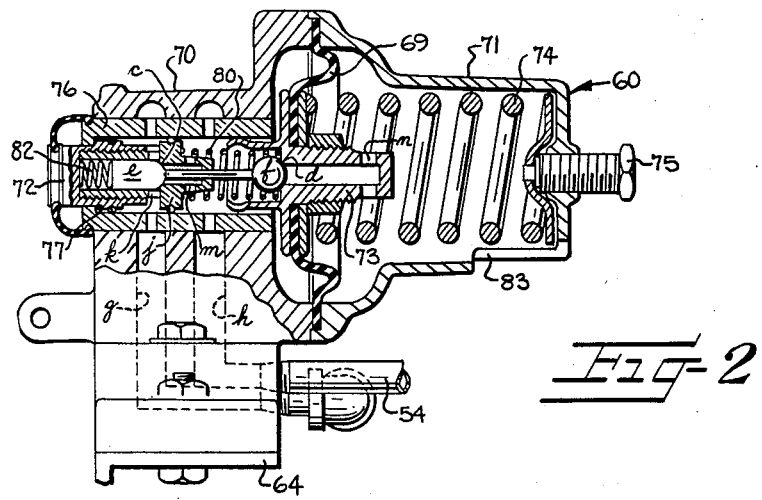
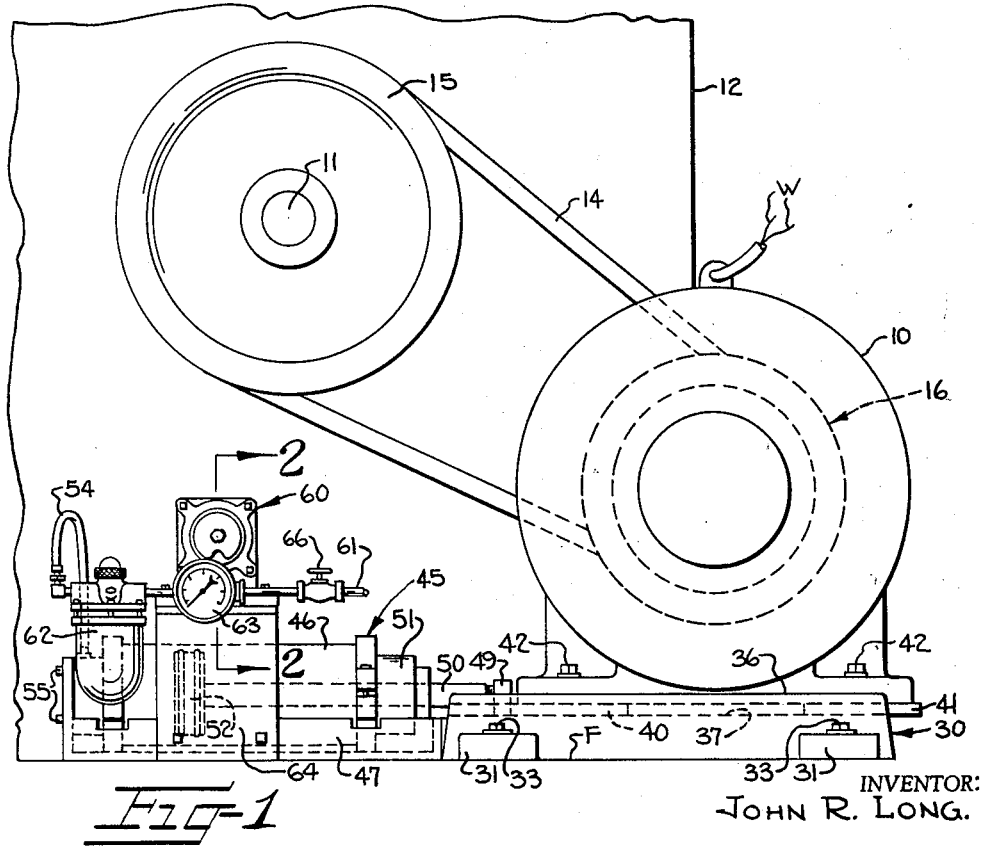
INVENTOR:
JOHN R. LONG.
BY Eaton, Bell, Hunt + Seltzer
ATTORNEYS March 8, 1960     J. R. LONG     2,927,471

BELT TENSIONING MOTOR SUPPORT

Filed Feb. 12, 1957     2 Sheets-Sheet 2

INVENTOR:
JOHN R. LONG

BY Eaton, Bell, Hunt & Seltzer

ATTORNEYS

United States Patent Office 2,927,471
Patented Mar. 8, 1960

2,927,471

BELT TENSIONING MOTOR SUPPORT

John R. Long, Hickory, N.C., assignor to Shuford Mills, Inc., Hickory, N.C., a corporation of North Carolina Application February 12, 1957, Serial No. 639,769

3 Claims. (Cl. 74—242.14)

This invention relates to power units of the character utilizing pulleys and belts between the driving and driven components and is particularly concerned with means for maintaining tension in belts of variable speed drives.

On October 7, 1955, I filed an application for Speed Control for Winding Machines, Serial Number 539,130, now Patent No. 2,803,107, which application is now copending. A related structure is also disclosed in my copending application entitled Variable Speed Control for Winding Machines and Method, Serial No. 635,346, filed January 22, 1957. These copending applications disclose means under control of the ring rail of a spinning machine for varying the speed of the machine, utilizing a fluid-pressure-operated variable speed pulley and a fixed diameter pulley with an interconnecting V-belt or V-belts, with spring means for maintaining tension in the belts.

As is well known, the more a tension spring is stretched or extended, or the more a compression spring is compressed, the greater the pressure exerted by the springs between the components to which they are connected or which they engage. Thus, the tension in V-belts between a fixed diameter pulley and a variable speed pulley is substantially greater when the variable speed pulley is operating at or adjacent to its maximum effective diameter than it is when the variable speed pulley is operating at its minimum effective diameter. This not only causes a relatively sluggish response between the driving and driven components but, more important, the variation in tension in the belts cause the belts to deteriorate rather rapidly and places the bearings in which the shafts of the driven and driving components are mounted under excessive radial pressures, with resultant undue wearing of the bearings.

It is an object of this invention to provide an improved movable support for a shaft-supporting element, such as an electric motor, which support is adapted to be positioned adjacent a second shaft, with pulleys on the two shafts and belts entrained thereover, with means for maintaining constant predetermined tension in the belts regardless of whether both the driving and driven pulleys have fixed diameters or either or both the driving and driven pulleys are variable pitch pulleys, thereby overcoming the aforementioned defects.

It is another and more specific object of this invention to provide apparatus of the character described wherein the shaft supporting element is in the form of an electric motor or other prime mover and including a motor support comprising a base having a support plate or plates guided for reciprocatory movement on the base with a fluid-pressure-operated ram assembly including a stationary part and a movable part connected to the base and the motor supporting plate, respectively. The stationary part is connected to a source of fluid pressure and a pressure regulator mechanism capable of maintaining a constant predetermined pressure in the ram assembly is interposed in the connection between the source of fluid pressure and the ram assembly.

Some of the objects of the invention having been stated, other objects will appear as the description proceeds, when taken in connection with the accompanying drawings, in which—

Figure 1 is a side elevation of a preferred embodiment of the invention;

Figure 2 is an enlarged vertical sectional view through the pressure regulator mechanism taken substantially along line 2—2 in Figure 1;

Figure 3:
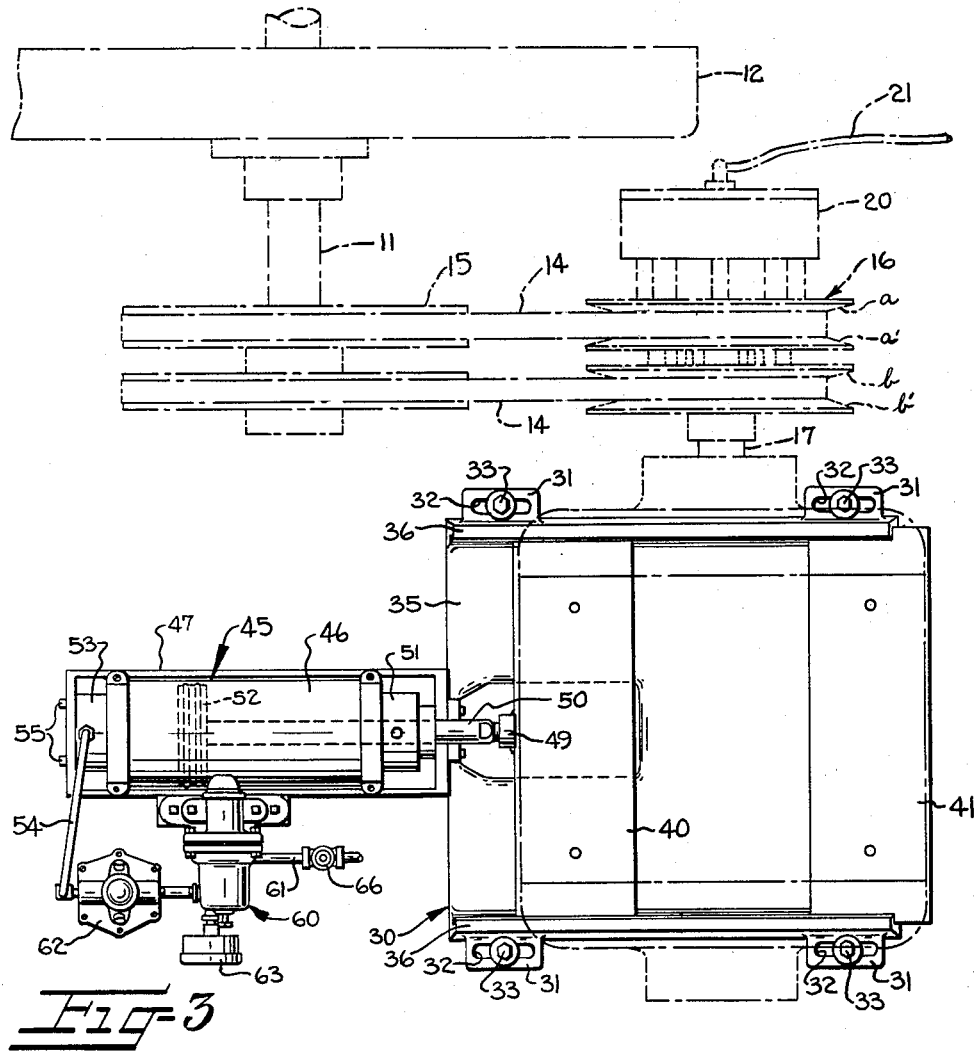
Figure 3 is a plan view of the motor support, showing the motor and the connections between the motor and a machine, in phantom lines.
Figure 4:
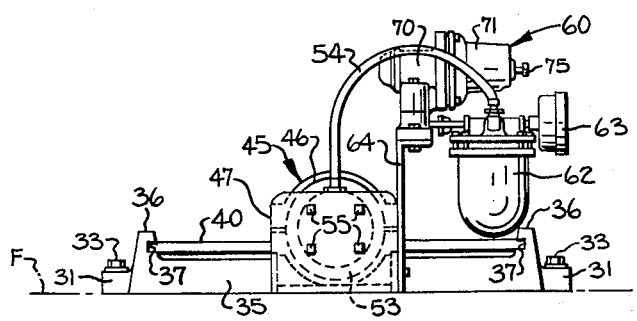
Figure 4 is a view looking at the left-hand side of Figure 3, omitting the parts of Figure 3 which are shown in phantom lines.

Referring more specifically to the drawings, a prime mover 10 is illustrated in Figures 1 and 3 in the form of an electric motor which shall hereinafter be defined as such. The motor 10, through a belt and pulley arrangement, drives a main shaft 11 of a machine 12, only a portion of the frame of which machine is shown in Figures 1 and 3. The motor 10 has conductors W leading therefrom to a source of current, not shown. The present invention is particularly valuable for use in driving spinning and twisting machines to effect variation in the speed of such machines as disclosed in my said co-pending applications, Serial Nos. 539,130, now Patent No. 2,803,-107, and 635,346, although the present invention may be used in association with the drive mechanism of any type of machine without departing from the spirit of the invention.

It will be observed in Figures 1 and 3 that the electric motor 10 is connected with the shaft 11 of the machine 12 through the agency of a belt or belts 14 and pulleys 15, 16 mounted on the shaft 11 of the machine 12 and a shaft 17 of said motor 10, respectively. While it is intended that the present invention is preferably used in conjunction with a variable pitch pulley, in which form the pulley 16 is shown, it may also be used to maintain belt tension in applications where both the driving and driven pulleys have fixed diameters.

Assuming that the pulley 16 is a variable speed pulley, it should be of a type whose cones or flanges are relatively adjustable to fixed positions rather than by increasing or decreasing the amount of tension in the belts or belt 14. The particular variable speed pulley 16 shown in Figure 3 is of a type substantially as disclosed in my copending application Serial No. 418,536, filed March 26, 1954, Now Patent No. 2,810,296, and entitled Variable Speed Drive and wherein the distance between complementary flanges or cones is determined by the amount of fluid pressure present in a cylinder 20.

Since the pulley 16 is exemplary of many different types of pulleys of well known construction, a detailed description thereof is deemed unnecessary, it being deemed sufficient to state that the particular type of pulley shown in Figure 3 includes two sets of flanges or cones *a*, *a'* and *b*, *b'* which are relatively axially movable on the shaft 17, although they are restrained from rotation relative to the shaft 17 and wherein, upon fluid pressure being admitted to the cylinder 20 through a conduit 21, the flanges *a*, *a'* move toward each other and the flanges *b*, *b'* move toward each other to increase the effective or pitch diameter of the variable speed pulley 16. Conversely, when fluid pressure is partially or entirely exhausted from the cylinder 20, the constant tension maintained in the belts 14 by my improved apparatus, to be later described, causes the flanges *a*, *a'* and the flanges *b*, *b'* to move apart from each other, thereby decreasing the effective or pitch diameter of the variable speed pulley 16.

Other pulleys which will serve in the capacity of the pulley 16 are disclosed in various patents such as U.S. Patents Nos. 2,198,940; 2,288,114 and 2,308,868.

Now, in order to maintain the belts 14 under constant tension, regardless of variation in the pitch diameter of either the driving or driven pulleys, or both, I have provided an improved motor support and control therefor comprising a base broadly designated at 30 which is adapted to be secured in a fixed position adjacent the machine 12 and which, in this instance, is provided with outwardly projecting ear portions 31 thereon, each of which is slotted, as at 32, and penetrated by a bolt or screw 33 for securing the same to a stationary surface, such as the floor F upon which the machine 12 rests. The base 30 includes a planar portion 35 which extends between the lugs or ears 31 and has a pair of longitudinally extending and upwardly projecting ribs 36 thereon whose proximal edges are provided with grooves to form ways or guides 37 for reception of opposite ends of a slide comprising a pair of lateral bars or plates 40, 41 to which the front and rear portions, respectively, of the motor 10 are suitably secured, as by screws 42.

The plates 40, 41 may be otherwise interconnected, or a single plate may be substituted therefor, without departing from the spirit of the invention. A fluid motor or fluid-pressure-operated ram assembly, broadly designated at 45, has its fixed part 46 mounted on a suitable frame 47 attached to and projecting forwardly from a medial forward portion of the planar portion 35 of the base 30. In this instance, the ram assembly or fluid motor 45 is shown in the form of a cylinder and piston arrangement, the fixed part 46 being shown in the form of a cylinder and the piston rod thereof being indicated at 50. The rear or free end of the piston rod 50 is suitably attached to the front lateral plate 40 as by being threaded into a projection 49 on the front edge of the plate 40.

The piston rod 50 is mounted for longitudinal movement in and slidably penetrates the head or rear end closure 51 of the cylinder 46 and has a piston 52 fixed on the inner end thereof which is mounted for axial sliding movement in the cylinder 46. The front end of the cylinder 46 has a closure member 53 thereon to which one end of a conduit 54 is connected for communication with the interior of the cylinder 46. In this instance, the closure member 53 is suitably secured to the front end of the frame 47, as by screws 55.

The conduit 54 leads to one side of a pressure control or regulator valve, broadly designated at 60, from the other side of which a conduit 61 extends to a suitable source of fluid pressure not shown, such as compressed air. The conduit 54 preferably has a suitable trap 62 and a pressure gauge 63 interposed therein. The pressure regulator valve 60 is fixed, by means of a bracket 64 to one side of the frame 47. The conduit 61 also preferably has a suitable manually operable shut-off valve 66 interposed therein.

The pressure regulator or control valve 60 may be of conventional or any desired construction. However, in order that the intricacies of the present invention may be clearly understood, a somewhat detailed description of the pressure regulator valve 60 will now be given. The pressure regulator valve 60 is shown in the form of a housing comprising a front or primary part 70 and a rear or secondary part 71 having a flexible diaphragm 69 fixed therebetween. A pair of valve plungers is mounted for relative coaxial movement in the housing of the valve 60, the front or primary valve plunger being indicated at 72 and the rear or secondary valve plunger being indicated at 73. Both of the valve plungers 72, 73 are of hollow construction.

The valve plunger 73 is also of built-up construction and is fixed to the central portion of the diaphragm 69. One end of a relatively heavy regulator spring 74 bears against the inner valve plunger 73. The pressure of spring 74 against the valve plunger 73 and diaphragm 69 is manually predetermined by means of an adjustment screw 75. The housing part 70 of the regulator valve 60 has a sleeve or tubular guide 76 fixed therein in which the outer or front valve plunger 72 is mounted for longitudinal sliding movement, said outer valve plunger being reduced at its outer end and loosely penetrating the corresponding end of sleeve 76 to form a shoulder 77 on the outer valve plunger 72 for limiting outward movement thereof.

A compression spring 80 normally urges the shoulder 77 against the restricted end of the sleeve 76, the end of spring 80 opposite from the outer plunger being seated against the corresponding end of the inner plunger 73. The left-hand end of plunger 73 is loose in the sleeve 76 so that air may pass therebetween.

As heretofore stated, the outer and inner plungers 72, 73 are of hollow construction and accordingly, they are provided with respective valve seats c, d against which respective interconnected valve members e, f are adapted to be seated. A compression spring 82, positioned within the outer plunger 72, normally urges the valve member e against its seat c. The housing part 70 of the pressure regulator valve 60 has a pair of passageways g, h therein which communicate with respective conduits 54, 61 and extend through the sleeve 76 at opposite sides of an enlarged medial portion j of the outer valve plunger 72.

The hollow outer valve plunger 72 has one or more passageways k for establishing communication between the passageway g and the valve seat c, while the portion of the valve plunger 72 to the right of the enlarged portion j thereof (Figure 2) has one or more passageways m therein, establishing communication between passageways h and the interior of the right-hand portion of the outer valve plunger 72. The right-hand housing part 71 of the pressure regulator valve 60 has an opening 83 therein which communicates with the atmosphere, and the right-hand end of the inner plunger 73 also has openings n therein which communicate with the housing part 71.

In order that the manner in which variation in the pressure in cylinder 46 of the air motor 45 is effected may be clearly understood, a description of the manner of operation of the pressure regulator valve 60 will now be given. The movable parts in the pressure regulator valve 60 normally occupy substantially the position shown in Figure 2 under optimum pressure conditions; that is, at times when the amount of pressure in the cylinder 46 (Figure 3) is such as to maintain the belt or belts 14 under predetermined tension as determined by adjustment of screw 75 in Figure 2. It is apparent that adjustment of the screw 75 determines the amount of pressure exerted by the spring 74 against the diaphragm 69 and the inner plunger 73.

Assuming that the cones or flanges a, b are moved toward the respective flanges a', b' to increase the effective diameter of the variable speed pulley 16 in Figure 3, it is apparent that the motor 10 must then move toward the driven shaft 11 which, momentarily, tends to increase the tension in the belts 14 and also tends to increase the pressure in the cylinder 46, conduit 54, passageway h of valve 60 (Figure 2) and the interior of the sleeve 76 between the outer and inner plungers 72, 73. This increase in pressure causes the inner plunger 73 to move to the right in Figure 2 against the spring 74 and, thus, moves the seat d of the plunger 73 away from the inner valve member f. In so doing, any excess pressure escapes through the hollow inner valve member 73, its passageways n and the opening 83 in the housing part 71 until such time as the pressure in the sleeve 76, between the plungers 72, 73, is equal to the pressure exerted by the spring 74.

Now, when the effective diameter of the variable speed pulley is decreased by movement of the flanges a, b away from the respective flanges a', b', the belts 14 then tend to become slackened and the pressure in the left-hand end of the cylinder 46 (Figure 3) tends to decrease. It is apparent that this tends to cause a corresponding decrease in the pressure in the conduit 54, passageway *h* and in the right-hand portions of the sleeve 76 and the housing part 70 (Figure 2). A decrease in pressure in the right-hand portions of the sleeve 76 and housing part 70 decreases the pressure against the spring 74 so the spring 74 causes the inner or right-hand plunger 73 (Figure 2) to move from right to left and to impart corresponding movement to the valve members *e*, *f*.

The valve member *f* remains seated while the valve member *e* then moves out of engagement with its seat *c* and permits additional pressure to flow from the conduit 61 through the passageways *g*, *k*, past the valve member *e*, through the hollow right-hand portion of the outer valve member 72, through the passageways *m* and thus into the right-hand portions of the sleeve 76 and the housing part 70 of the valve 60. It is apparent that this increases the pressure in the cylinder 46 and returns the inner plunger 73 to its optimum position, in which both of the valve members *e*, *f*, are seated as shown in Figure 2.

It is thus seen that I have provided a novel belt tensioning apparatus in which belts 14 are maintained under constant tension, regardless of variation in the diameter of the variable speed pulley 16 and wherein the tension in the belts 14 need only be sufficient to move the driving shaft 17 and its supporting means toward the driven shaft 11 at such times as the diameter of the variable speed pulley 16 is increased. As heretofore stated, the improved belt tensioning apparatus may also be used in conjunction with drive mechanisms in which the driven and driving pulleys are of fixed diameters, since this greatly assists in mounting belts on such pulleys when the driving shaft is moved toward the driven shaft, with a tension being applied to a belt or belts after the belts are mounted on the pulleys. Also, it is well known that belts will stretch to some extent as they are used, and the present invention insures that the tension in such belts is maintained constant and predetermined from the time the belts are mounted on pulleys until they are removed from pulleys.

In the drawings and specification there has been set forth a preferred embodiment of the invention and although specific terms are employed, they are used in a generic and descriptive sense only and not for purposes of limitation, the scope of the invention being defined in the claims.

I claim:
1. In a variable speed drive mechanism including a motor having a driving shaft and a driving pulley mounted on said shaft, a driven shaft having a driven pulley mounted thereon, one of said pulleys being a variable speed cone pulley, a belt entrained about said pulleys and means operable independently of the belt for moving one flange of said variable speed cone pulley axially along its corresponding shaft relative to the other flange of said variable speed cone pulley to effect radial movement of the belt relative to said corresponding shaft and vary the speed of the driven shaft; the combination of means supporting said motor for inward and outward movement relative to said driven shaft, and means responsive to axial movement of said one flange for imparting movement to the motor and its driving shaft relative to the driven shaft to continuously maintain said belt under constant uniform tension at all speeds.

2. A structure according to claim 1 wherein said supporting means comprises a fixed base, guide means arranged on said base and extending in a direction parallel to the path of said belt, plate means movably mounted on the guide means, means for securing the motor to the plate means, said responsive means comprising a fluid-pressure-operated ram having a fixed portion and a movable portion, the fixed portion being secured in spaced relation to the base and the movable portion being connected at its free end to said plate means, and a pressure regulator valve communicatively connected to the ram for controlling reciprocatory movement of the movable portion.

3. In a variable speed drive mechanism including a driving shaft, means carrying and imparting rotation to said driving shaft, a variable-speed-cone driving pulley mounted on said shaft, a second shaft having a driven pulley mounted thereon, an endless belt entrained about said pulleys, and means operable independently of the belt for moving one flange of said driving pulley along said driving shaft relative to the other flange of said driving pulley to effect radial movement of the belt relative to said driving shaft and to vary the speed of said driving pulley; the combination of a fixed base, a support for said carrying means mounted for inward and outward movement on said base relative to said second shaft, a fluid-pressure-operated ram having a fixed portion and a movable portion, the fixed portion being secured to said base, means securing said movable portion to said support, and a pressure regulator valve interposed in a fluid pressure line from a source of fluid pressure to the fixed portion, said fluid pressure line being communicatively connected to said fixed portion in such relation to the driving and second shafts as to apply pressure to said support and, consequently, to said belt, and said valve serving to maintain said pressure uniform whereby, regardless of the position of said one flange relative to said other flange of the driving pulley, the tension in said belt remains uniform.

References Cited in the file of this patent
UNITED STATES PATENTS

| | | |
|---|---|---|
| 604,085 | Richards | May 17, 1898 |
| 1,730,319 | Dilks | Oct. 1, 1929 |
| 1,792,242 | Reeves | Feb. 10, 1931 |
| 2,424,806 | Eaton | July 29, 1947 |
| 2,463,031 | Hallinan | Mar. 1, 1949 |
| 2,507,904 | Heller et al. | May 16, 1950 |